United States Patent
Hamada et al.

(10) Patent No.: US 7,255,407 B2
(45) Date of Patent: Aug. 14, 2007

(54) VEHICLE BRAKING CONTROL DEVICE FOR BRAKING FORCE DISTRIBUTION

(75) Inventors: Chiaki Hamada, Mishima (JP); Akifumi Doura, Obu (JP)

(73) Assignees: Toyota Jidosha Kabushiki Kaisha, Toyota (JP); Advics Co., Ltd., Kariya (JP)

( * ) Notice: Subject to any disclaimer, the term of this patent is extended or adjusted under 35 U.S.C. 154(b) by 0 days.

(21) Appl. No.: 10/815,794

(22) Filed: Apr. 2, 2004

(65) Prior Publication Data

US 2004/0256912 A1 Dec. 23, 2004

(30) Foreign Application Priority Data

Apr. 7, 2003 (JP) ............... 2003-103136

(51) Int. Cl.
*B60T 13/00* (2006.01)
(52) U.S. Cl. ............... 303/9.62; 303/DIG. 2; 701/78; 701/83
(58) Field of Classification Search ............ 303/3, 303/5, 7, 9.62, 9.71, 9.73, 15, 125, 138, 155, 303/158, 167, 173, 186, DIG. 1, DIG. 2; 701/70, 71, 78, 79, 83
See application file for complete search history.

(56) References Cited

U.S. PATENT DOCUMENTS

| | | | |
|---|---|---|---|
| 5,549,369 A | 8/1996 | Rump et al. | 303/125 |
| 6,338,017 B1 * | 1/2002 | Kato et al. | 701/79 |
| 6,385,523 B1 * | 5/2002 | Yokoyama et al. | 701/70 |
| 6,474,751 B1 | 11/2002 | Yamaguchi et al. | 303/116.4 |
| 6,595,600 B2 * | 7/2003 | Banno et al. | 303/113.5 |
| 6,623,090 B2 * | 9/2003 | Ullmann et al. | 303/155 |
| 2002/0185913 A1 | 12/2002 | Watanabe | 303/139 |

FOREIGN PATENT DOCUMENTS

| | | |
|---|---|---|
| DE | 43 00 048 A1 | 10/1994 |
| JP | A 5-213169 | 8/1993 |
| JP | A 7 117655 | 5/1995 |
| JP | 2000-335389 A * | 12/2000 |
| JP | A 2001-219834 | 8/2001 |
| JP | 200237044 A * | 2/2002 |
| JP | A 2003-160039 | 6/2003 |

\* cited by examiner

*Primary Examiner*—Melody M. Burch
(74) *Attorney, Agent, or Firm*—Oliff & Berridge, PLC

(57) ABSTRACT

A braking control device for a vehicle executes braking force distribution (BFD) biased to the front wheels, taking into account auxiliary braking control such as braking assist control (BAS) executed when an abrupt or full braking action is performed by the driver. In BFD control a braking force on the rear wheels is held at a holding braking force and a braking force on the front wheels is incremented beyond a braking force requested by a braking action of the driver. After the starting of BFD control, further increase in the braking action is reflected in the braking force of the front wheels. When auxiliary braking control is executed, the holding braking force on the rear wheels and the increment of the braking force on the front wheels are determined based upon a demand of the auxiliary braking action as well as the braking action amount by the driver.

13 Claims, 5 Drawing Sheets

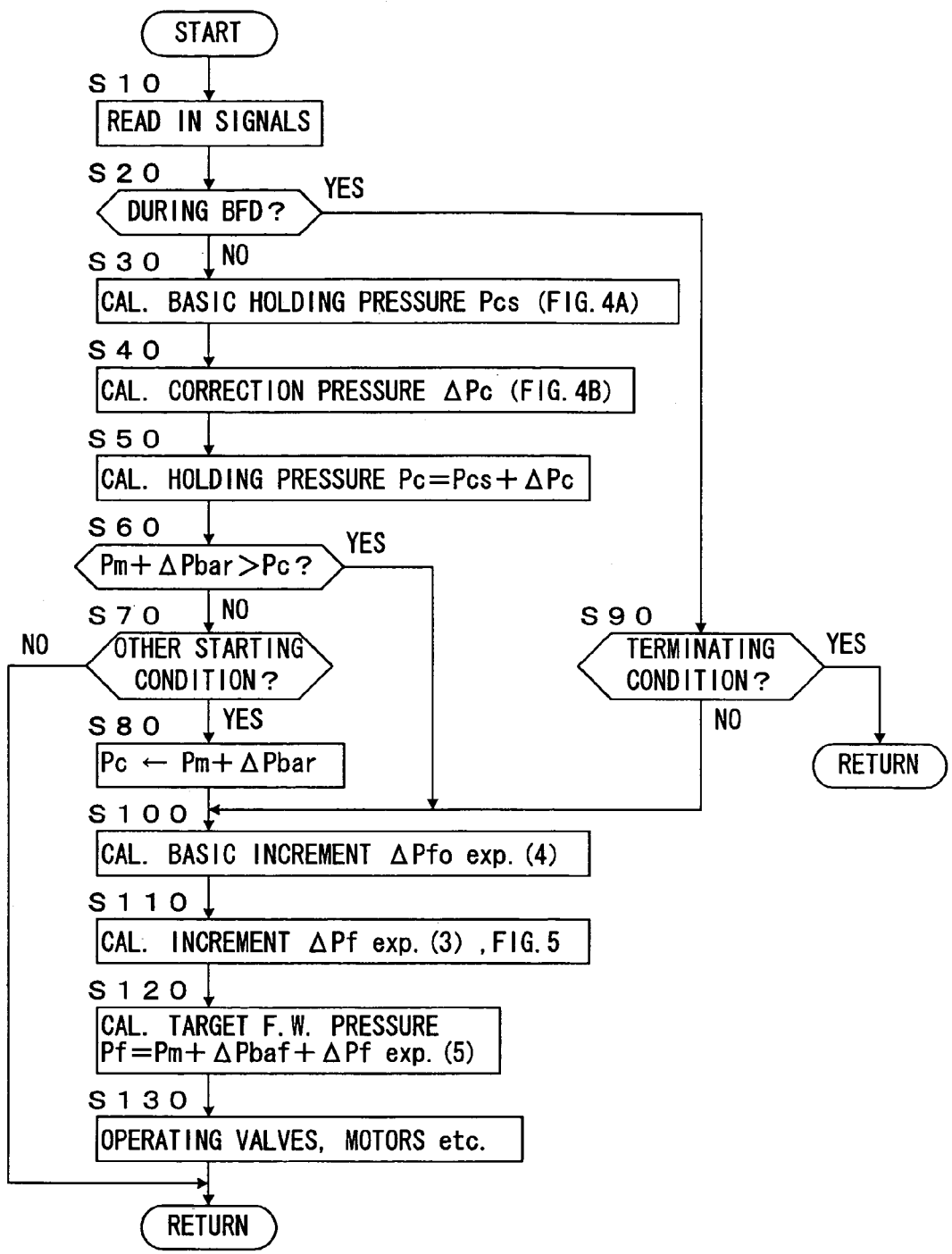

VEHICLE BRAKING CONTROL DEVICE FOR BRAKING FORCE DISTRIBUTION

BACKGROUND OF THE INVENTION

1. Field of the Invention

The present invention relates to a device for controlling brakes of a vehicle such as an automobile, and more specifically, to such a device that controls braking force distribution among front and rear wheels in a vehicle.

2. Description of Prior Art

During braking of a vehicle, a rear wheel is liable to lock if its frictional circle shrinks due to a forward shifting of the load of the vehicle. The locking of a rear wheel, prior to locking of a front wheel, induces serious deterioration in vehicle running behavior, such as disturbance in the attitude and/or spinning of the vehicle body. In order to avoid the locking of a rear wheel, braking force distribution (BFD) control has been proposed to keep braking force on rear wheels lower than on the front wheels. In such BFD control, braking pressures applied to rear wheel cylinders in a hydraulic braking system are held, reduced or pulsatively increased, i.e. the increase in braking force generated on the rear wheels is restricted, providing a distribution of braking force biased to the front wheels. Usually, BFD control, often referred to as "Electronic Braking force Distribution Control (EBD control)", is executed by a computerized device operating a plurality of solenoid valves in a hydraulic circuit. Examples of devices executing EBD control are seen in Japanese Laid-Open Patent Publications (JP) Nos. 5-213169 and 2001-219834.

Under EBD control, a demand from a driver of a vehicle for increasing braking force (e.g. a depression of a brake pedal) is modified to restrict a braking force on the rear wheels, which would cause the reduction of the total braking force. Thus, the driver would feel that the actually generated braking force is incompatible with his braking operation. In order to eliminate this feeling of the incompatibleness while maintaining the braking performance and behavior of a vehicle, JP No. 2001-219834 discloses an EBD control device, in which, after once restricted, braking force on rear wheels is pulsatively increased in response to the increase of a braking action by a driver under a certain running condition. To prevent locking of the rear wheels, however, braking force on the rear wheels cannot be increased limitlessly.

Accordingly, it is preferable that, in BFD control device, total braking force on a vehicle body may be rendered as close to the amount requested by a driver of the vehicle as possible, without inducing the locking of the rear wheels and the instability in the vehicle attitude induced therefrom.

Further, in the above-mentioned device, auxiliary braking control, such as Braking Assist Control (BAC) to be operated simultaneously with BFD or EBD control is not taken into account. Such auxiliary braking control increases a braking pressure beyond the amount requested from a driver of a vehicle so as to assist the driver in keeping her/his vehicle stable, so BFD control should be executed compatibly with any auxiliary braking control without reducing its effect.

Accordingly, a BFD control device may be improved more appropriately in conjunction with auxiliary braking control.

SUMMARY OF INVENTION

According to the present invention, there is provided a novel braking control device for a vehicle executing braking force distribution control. The control device may be designed to apply an operational fluid pressure in a master cylinder to wheel cylinders provided for the respective wheels (e.g. through a hydraulic circuit), producing braking force on the corresponding wheels under a normal condition. Under a certain operational condition of the vehicle, however, the control device starts restricting the increase of the braking force on the rear wheels or holds the rear wheel cylinders at a holding pressure, determined based upon the vehicle's running conditions, while increasing the braking force on the front wheels depending upon the restricted amount of the braking force on the rear wheels. The holding of the rear wheel cylinders at the holding pressure may be performed by closing valves in the lines to the rear wheel cylinders, for example. The BFD control may be started when the pressure in the rear wheel cylinder, the deceleration of the vehicle and/or the difference of slippage between the front and rear wheels reaches the corresponding predetermined value. During execution of BFD control, further increment of the braking force requested on a vehicle body will be added to the braking force on the front wheels.

In accordance with this novel BFD control, the increased braking force on the front wheels can compensate for a shortage of the braking force on the rear wheels, ensuring the generation of a total braking force to be applied on a vehicle body. The increment in the front wheel braking pressure corresponds to the restricted amount of braking force on the rear wheels, so that the total braking force on the vehicle body can be rendered in conformity with the amount requested by a driver of the vehicle without inducing locking of the rear wheels and instability in the vehicle attitude induced therefrom.

The increment in the front wheel braking force, required through this control, may be estimated based upon a rear wheel braking pressure. In this regard, braking force generating apparatuses for the front and rear wheels, even supplied with operational fluid from a master cylinder at the same pressure, exhibit different braking performances, which decrease with an increase in the vehicle speed. Thus, in derivation of the increment to be added into the front wheel braking pressure, an amount of a braking action by a driver of the vehicle and parameters indicating braking performances of braking force generating apparatuses of the front and rear wheels will be taken into account. Then, the precise and appropriate control of the front wheel braking force is allowed based upon pressures in a hydraulic circuit of a braking system. In this connection, for reflecting the vehicle-speed dependence of the performance of the braking force generating apparatus in the control, preferably, the braking performance indicated by the parameters should have the same vehicle-speed dependence of decreasing with the increase of a vehicle speed. For a parameter of such braking performances, useful is a vehicle speed-dependent, braking effectiveness factor of a front wheel upon a vehicle.

Further, preferably, the amount of rear wheel braking force to be decremented or the holding pressure may be determined based upon a vehicle speed, a deceleration and/or other vehicle running condition at the starting of BFD control.

In another aspect of the present invention, there is provided a novel control device for braking a vehicle having front and rear wheels, a braking system generating braking forces on the respective wheels, and at least one sensor monitoring an operational condition of the vehicle, including a detector detecting an amount of braking action by a driver of the vehicle. In response to a variation of the operational condition monitored by the sensor, the control device executes braking force distribution control in which braking force on the rear wheels is lowered in comparison with that on the front wheels while the braking force on the front wheels is increased based upon an increment of the braking action amount by the driver, detected by the detector. Namely, further increase in the braking action after the starting of BFD control is reflected in the front wheel braking force.

During execution of auxiliary braking control for increasing the braking force on wheels beyond a braking force corresponding to the amount of braking action by the driver, the braking force on the front wheels is increased based upon the increment in the braking action amount by the driver plus an increment in the braking force requested by the auxiliary braking control. The auxiliary braking control may be braking assist control to be executed when an abrupt or full braking action is performed by the driver.

As described above, during execution of auxiliary braking control such as BAC, total braking force on a vehicle body exceeding the amount requested from a driver of a vehicle is preferable or required for assisting the driver to keep her/his vehicle stable. In accordance with the present invention, by taking into account the increment requested by the auxiliary braking control as well as the demand of the driver (e.g. the master cylinder pressure), the increment in the front wheel braking force can compensate for a shortage in the total braking force due to the restriction of the rear wheel braking force in the BFD control, generating the total braking force expected by the auxiliary braking control as well as the driver demand, without locking the rear wheels prior to locking the front wheels, and thereby providing a more appropriate running condition of the vehicle.

Typically, the braking force on the wheels is adjusted through a hydraulic circuit connected with a master cylinder and braking force generating apparatus, including wheel cylinders, provided for the respective wheels. In the absence of BFD control, the braking pressure for the rear wheels would be equal to a current master cylinder pressure plus the pressure increment requested by auxiliary braking control. Thus, in order to compensate for the restricted or decremented amount of the braking force on the rear wheels, the increment in the front wheel braking pressure may be calculated based upon a difference between a current master cylinder pressure plus an increment in braking pressure requested by auxiliary braking control and a holding pressure for the rear wheels (or a master cylinder pressure at the start of BFD control). When no auxiliary braking control is executed, the increment in braking pressure requested by auxiliary braking control is to be neglected, of course.

Further, if the pressure increments for the front and rear wheels are different from each other, preferably, the increment in braking pressure requested by auxiliary braking control used in the above-mentioned calculation is the pressure increment requested for the rear wheel, in view of the purpose of compensating for the reduction in braking force of the rear wheels.

The present invention is successfully applied to a hydraulic braking system, typically employed in a four-wheeled vehicle, having valves provided for individual wheel cylinders for adjusting the respective braking pressure and at least a common hydraulic line for applying braking pressure from a pressure supply to the wheel cylinders. More specifically, such a braking system has dual circuits, one for the front wheels and another one for the rear wheels (front and rear (F-R) dual circuits), or one for the front-left and rear-right wheels and another one for the front-right and rear-left wheels (cross (X) dual circuits), each circuit having a common line, the pressure in which is controlled with a single valve, which may be a linear solenoid valve.

Thus, it is an object of the present invention to provide new and novel devices for controlling a brake of a vehicle for executing braking force distribution among front and rear wheels of the vehicle, rendering the braking force on the rear wheels smaller than on the front wheels under a certain condition, and thereby, ensuring generation of a total braking force requested on the vehicle while avoiding locking of the rear wheels prior to locking of the front wheels and deterioration of the vehicle's attitude stability.

It is another object of the present invention to provide such devices restricting the increase of braking force on the rear wheels while increasing the braking force on the front wheels, compensating for the shortage in total braking force on the vehicle.

It is a further object of the present invention to provide such devices wherein the increment added to the braking force on the front wheels is derived based upon the decrement in braking force on the rear wheels through calculation of braking pressures in a hydraulic braking system of a vehicle.

It is a further object of the present invention to provide such devices wherein braking force distribution control is executed, taking into account auxiliary braking control, if any, as well as a braking action by a driver of a vehicle.

It is another object of the present invention to provide such devices that ensure generation of a braking force on a vehicle requested by a driver and auxiliary braking control, if any, without locking of the rear wheels prior to locking of the front wheels.

It is another object of the present invention to provide such devices that execute braking force distribution control compatible with auxiliary braking control such as braking assist control, ensuring generation of a total braking force requested on a vehicle while avoiding locking of the rear wheels prior to locking of the front wheels.

Other objects and advantages of the present invention will be in part apparent and in part pointed out hereinafter.

BRIEF DESCRIPTION OF THE DRAWINGS

In the accompanying drawings,

FIG. 6 is a example of a flowchart executed in a braking force distribution control device of a preferred embodiment of the present invention.

DESCRIPTION OF PREFERRED EMBODIMENTS

Figure 1A:
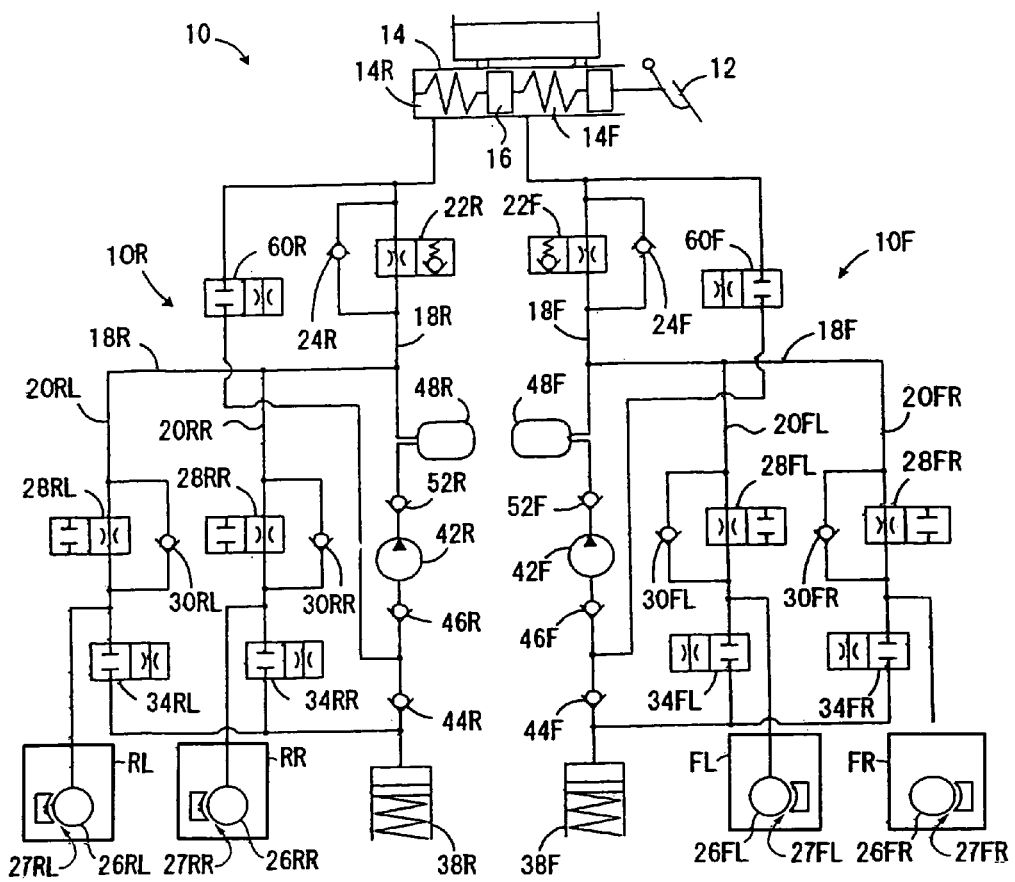
FIG. 1A is a schematic diagram of a hydraulic circuit in a braking control device for a four-wheeled vehicle of a preferred embodiment according to the present invention.
Figure 1B:
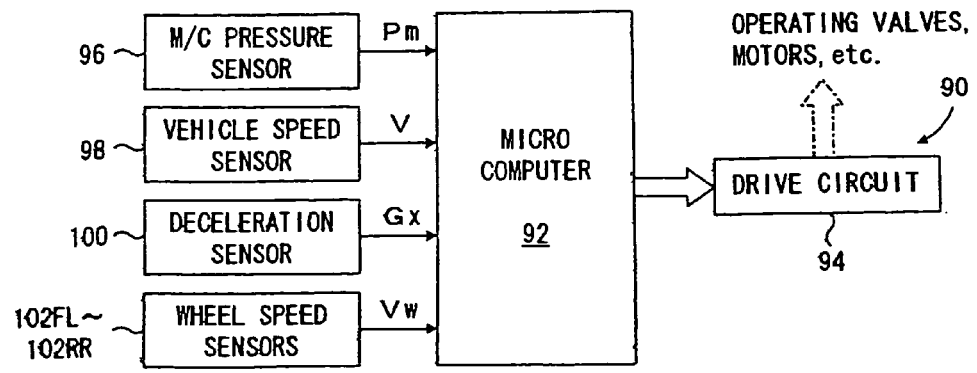
FIG. 1B is a schematic diagram of an electronic controller in a braking control device for operating the components in the hydraulic circuit shown in FIG. 1A.

FIG. 1 illustrates a schematic diagram of a braking system implementing an embodiment of a control device for controlling braking force for a vehicle, enabling BFD control according to the present invention, which braking system consists of a hydraulic circuit 10 (FIG. 1A), transmitting a pressure in a master cylinder 14 (master cylinder pressure) to wheel cylinders 26$i$ (i=FL, FR, RL, RR =front-left, front-right, rear-left and rear-right wheels, respectively) in braking force generating apparatuses 27$i$ provided for the respective wheels (not shown), and an electronic controller 90 (FIG. 1B) controlling brake fluid flows in the hydraulic circuit by operating solenoid valves and other components therein.

Referring to FIG. 1A, the illustrated hydraulic circuit 10 is a Front-Rear dual circuit type, having two circuits, one circuit 10F for a pair of front left and right wheel cylinders 26FL, 26FR and the other circuit R for a pair of rear left and right wheel cylinders 26RL, 26RR. It should be noted that the two circuits may have the same piping structure, otherwise noted (in an actual braking system, these may be different from each other, of course).

As usual, a braking action of a driver of the vehicle, e.g. by depressing a brake pedal 12, pressurizes brake fluid in the master cylinder 14, compartmentalized into master cylinder chambers 14F and 14R with a free piston 16 movably supported with springs. To each chamber 14F, R is connected a common line 18F, R of the corresponding circuit 10F, R, respectively, leading to two branches 20$i$ connected to the respective wheel cylinders 26$i$ of brake force generating apparatuses 27$i$ for wheels RL, RR, FL FR. In each branch 20$i$, there is provided a two-state, normally opened, solenoid valve 28$i$, selectively allowing brake fluid from the common line 18F, R (i.e. from the master cylinder 14) to flow into the respective wheel cylinder 26$i$, and thereby the wheel cylinder 26$i$ will be selectively pressurized or held at a pressure by opening or closing the corresponding valve 28$i$. In order to avoid excessive pressurization of each wheel cylinder, a check valve 30$i$, allowing only flow from the wheel cylinder 26$i$ to the common line 18F, R, is provided in parallel to the solenoid valve 28$i$. The branches 20$i$ are also connected with buffer reservoirs 38F, R, provided with the respective circuit 10F, R, via two-state, normally closed, solenoid valves 34$i$ as shown, so that the pressure in each of the wheel cylinders can be selectively released by opening the corresponding valve 34$i$.

Each circuit 10F, R further comprises a normally opened, linear pressure regulation valve 22F, R in the corresponding common line 18F, R; a motor-driven pump 42F, R with a damper 48F, R, positioned between the reservoir 38F, R and the common line 18F, R; and a normally closed, solenoid valve 60F, R selectively fluidly communicating the master cylinder chamber 14F, R to the corresponding pump input. These components are provided for regulating the pressure in the common line when braking pressure in a wheel cylinder 26$i$ is to be increased beyond master cylinder pressure.

In detail, when the linear pressure regulation valve 22F, R and valve 60F, R are closed and opened, respectively, the master cylinder pressure is supplied to the pump input. Then, the pump 42F, R, when operated, pumps up brake fluid from the reservoir 38F, R and the master cylinder into the common line 18F, R. As described below in more detail, the linear pressure regulating valve 22F, R, when switched into a closed position, allows flow from the common line to the master cylinder only when the pressure in the common line exceeds a pressure determined by controlling the energization current supplied to solenoid coils in accordance with the controller 90. Further, since the master cylinder pressure is supplied through the valve 60F, R to the pump input, the pressure in the common line will not be lowered below the master cylinder pressure. A check valve 24F, R, connected in parallel with the regulating valve 22, also prevents the common line pressure from lowering below the master cylinder pressure. Accordingly, the pressure in the common line 18F, R is regulated at a pressure beyond the master cylinder pressure under the control of the controller 90.

Check valves 44F, R, 46F, R and 52F, R may be provided for avoiding any flow in undesirable directions. The damper 48F, R may be provided for smoothing out the pump output.

Referring to FIG. 1B, electronic controller 90 incorporates a microcomputer 92, which may be of an ordinary type including a central processor unit, a read only memory, a random access memory, input and output port means and a common bus interconnecting these elements (not shown). The microcomputer 92 receives a signal of master cylinder pressure Pm, from a master cylinder pressure sensor 96 provided near the master cylinder 14; a signal of a vehicle speed V from a vehicle speed sensor 98; a signal of a vehicle longitudinal deceleration Gx from a longitudinal deceleration sensor 100; signals of wheel speeds Vw$i$ from the respective wheel speed sensors 102$i$; calculates target braking pressures Pt$i$ (i=FL, FR, RL, RR) and operates the valves, pumps, etc., through a driving device 94 in accordance with a control flow and related data, stored in memory in the microcomputer, as explained below. The sign of the deceleration signal Gx is defined as positive in the direction decreasing the vehicle speed.

Figure 2:
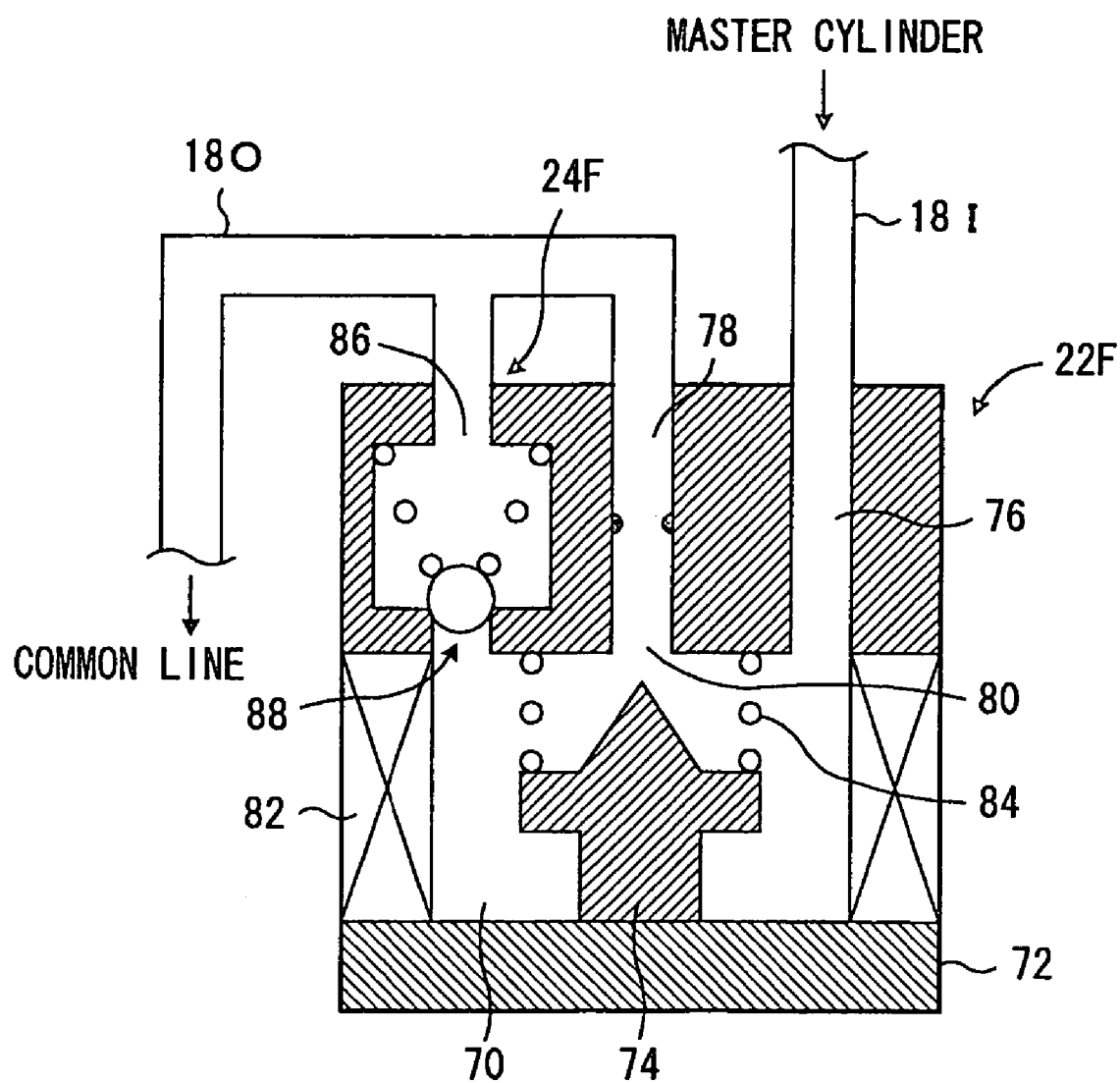
FIG. 2 is a schematic, sectional view of a pressure regulating valve employed in the hydraulic circuit shown in FIG. 1A.

FIG. 2 shows a schematic diagram of the linear pressure regulating valve 22F(R), incorporating the check valve 24F(R), provided in each common line 18F, R. As shown, the valve comprises a housing 72 receiving an inlet line 18I connected to the master cylinder chamber 14F(R) and an outlet line 180 leading to the common line 18F(R) for the wheel cylinders 26$i$; a valve chamber 70; a valve body 74 movable up and down in the valve chamber; and solenoid coils 82. The inlet and outlet lines 18I, 180 are opened to the valve chamber 70 through internal lines 76 and 78, respectively.

In the absence of energization of the solenoids 82, the valve body 74 is biased downwardly by a compression spring 84, opening an aperture 80 of the internal line 78 for the outlet line 180 and rendering the common line 18F(R) exposed to the master cylinder pressure. When the solenoids are energized, the valve body is moved upwardly against the spring force, closing the aperture 80 and shutting out the fluid communication between the master cylinder and common line. Since, however, the common line is pressurized with the pump 42F(R), the valve body opens the aperture when the sum of the spring force and the pressure in the common line exceeds the sum of the master cylinder pressure and the electromagnetic force moving the valve body upwardly, allowing the flow from the common line to the valve chamber 70. Accordingly, the pressure in the common line 18 F(R) will be regulated by adjusting the energization current supplied to the solenoids. In this connection, for ensuring this pressure regulation in the common line, the check valve 24F(R), consisting of a valve ball biased by a spring for closing an aperture 88 opened to the valve chamber 70, is provided in parallel, allowing only the flow from the valve chamber to the common line in order to maintain the common line pressure at or above the master cylinder pressure. (The pressure regulation would not work if the common line pressure is lowered below the master cylinder pressure, because the flow from the valve chamber 70 to the common line 180 would occur upon opening the aperture 80.)

In operation, the valves in the hydraulic circuit 10 are positioned as shown in FIG. 1A under normal condition (in the absence of BFD). Thus, the master cylinder pressure is directly reflected in the whole wheel cylinders 26i. The wheel cylinder pressures Pwi are substantially equal to the master cylinder pressure Pm.

However, when it is judged that BFD control is to be started in response to the depression of the brake pedal, etc. (the conditions requiring BFD are explained below in more detail), the valve 28RL, RR in the circuit 10R are closed, isolating the rear wheel cylinders 26RL, RR and holding them at a holding pressure Pc to be determined in a manner as described below. Further, in the circuit 10F, the regulating valve 22F and the valve 60F are closed and opened, respectively, and the pump 42F is operated. Then, only the pressures in the common line 18F and wheel cylinders 26FL, FR are varied for generating braking force on the respective front wheels by adjusting the energization current fed to the solenoids in the valve 22F with the controller 90.

Consequently, in this embodiment of the present invention, during execution of BFD control, the rear wheel cylinders are held at the holding pressure in order to prevent locking of the rear wheels prior to locking of the front wheels; the increase in the braking action by the driver after starting BFD control is reflected only in the pressure in the front wheel cylinders. Under this condition, the front wheel braking pressure is increased beyond the master cylinder pressure, compensating for a shortage in the braking force due to the restriction of the pressure increase in the rear wheel cylinder.

Before starting BFD, if an auxiliary braking control such as BAC has been operated to increase the wheel cylinder pressure beyond the master cylinder pressure, the pressure regulating valves 22F, R and valves 60F, R have been closed and opened, respectively, and the pumps 42F, R operated. Accordingly, the rear wheel cylinder pressure is substantially equal to the master cylinder pressure plus the increment requested by BAC. When the BFD control is to be executed under this condition, the valves 28RL, RR are closed to hold the rear wheel cylinders at the current pressure therein, and thereafter, the front wheel braking pressure is controlled with the pressure regulating valve 22F.

Figure 3A:
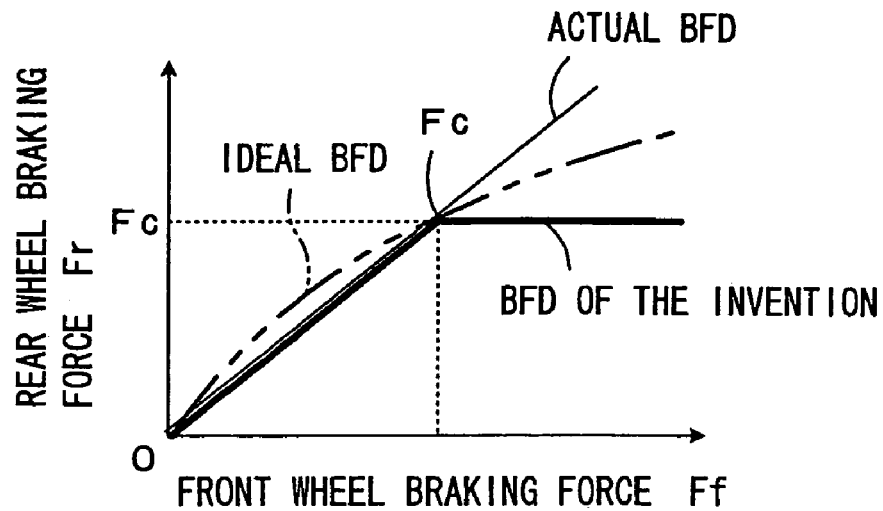
FIG. 3A shows a phase diagram of a condition of braking force distribution among front and rear wheels, showing an ideal braking force distribution line (two-dotted line), an actual braking force distribution line (thin solid line) in a case that the same braking pressure is applied to the front and rear wheels; and a braking force distribution line obtained in a preferred embodiment of the present invention.
Figure 3B:
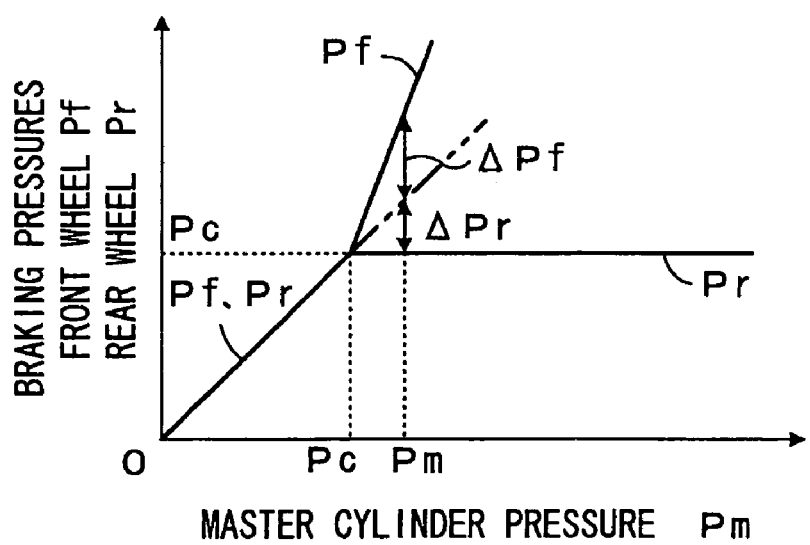
FIG. 3B shows graphs of the relations between braking pressures Pf, Pr in front and rear wheels and master cylinder pressure Pm under braking force distribution control of a preferred embodiment of the present invention.

With reference to FIGS. 3A and 3B, a control strategy in the embodiment of the present invention will be explained below.

FIG. 3A shows a phase diagram of a condition of braking force distribution among front and rear wheels, where the theoretically obtained ideal BFD line, well known in the art, (two-dot dashed line) and an actual BFD line (thin solid line) are drawn.

The ideal BFD line indicates a condition in which braking force is distributed among the front and rear wheels so that the front and rear wheels will lock simultaneously (Details of this line are described elsewhere). Thus, if a condition of braking force distribution is above this line, the possibility that a rear wheel will lock prior to the front wheels is high.

The actual BFD line indicates a condition in which the same pressure is applied to the wheel cylinders when a vehicle runs at a certain speed. As shown, the actual BFD line linearly increases below the ideal line and intersects with the ideal line at a certain point Fc. Thus, further increase in the rear wheel braking force along the actual line would induce locking of the rear wheel prior to locking of the front wheels. In order to avoid this, in this embodiment, the rear wheel braking force should be held at the force of the intersecting point Fc, i.e. further increase of the rear wheel braking force is restricted. The force Fc corresponds to a holding pressure Pc. As seen from FIG. 3A, further increase of the total braking force under the condition that the rear wheel braking force would exceed Fc, the master cylinder pressure Pm exceeds the holding pressure (Pm>Pc) is reflected in the front wheel braking force or pressure as shown in the thick line.

In this connection, it has been revealed in practice that, when the vehicle speed increases, the ratio of the braking effectiveness of a front wheel to that of a rear wheel is reduced; the decrement of the braking force on a rear wheel due to the increase of the vehicle speed is smaller than that on the front wheel if the same braking pressure is applied to those wheel cylinders. Accordingly, the actual line is brought closer to the rear wheel axis (ordinate) and the intersecting point Fc is shifted toward 0 along the ideal BFD line, resulting in that the holding force or pressure Fc, Pc should be decreased with the increase of the vehicle speed.

Further, the ideal BFD line is shifted upwardly as a vehicle weight increases. In such a case, as seen from the phase of FIG. 3A, it is preferable that the holding pressure is to be increased, thereby allowing the generation of larger braking force on rear wheels without exerting excessive load on the front wheels. In order to take into account the effect of the vehicle weight on the braking force distribution, the holding pressure determined based upon the vehicle speed is preferably modified to increase as the deceleration decreases. (Supposing a certain braking force is exerted on a vehicle, the deceleration is decreased as the vehicle weight (mass) increases: Braking force=Mass×Deceleration.)

Figure 4A:
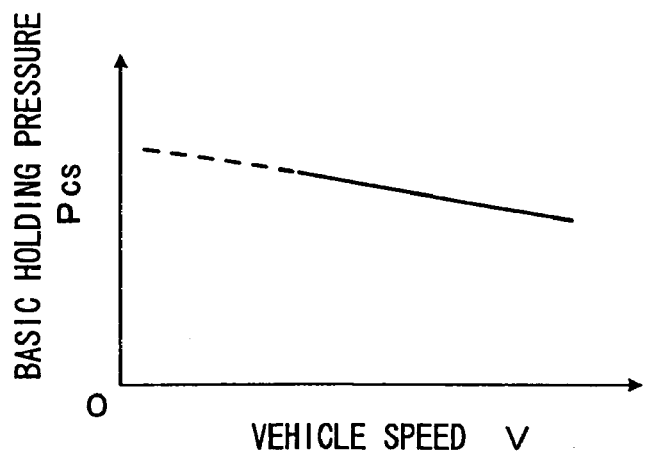
FIG. 4A shows a map of basic holding pressure for rear wheels Pcs vs. vehicle speed V, used in calculation of the basic holding pressure.

Practically, in the present embodiment, the holding pressure Pc may be determined as a function of a vehicle speed V and a deceleration Gx by using maps of Basic holding pressure Pcs vs. Vehicle speed V as shown in FIGS. 4A and Correction pressure ΔPc vs. Deceleration Gx as shown in 4B as follows:

$$Pc=Pcs+\Delta Pc. \tag{1}$$

Figure 4B:
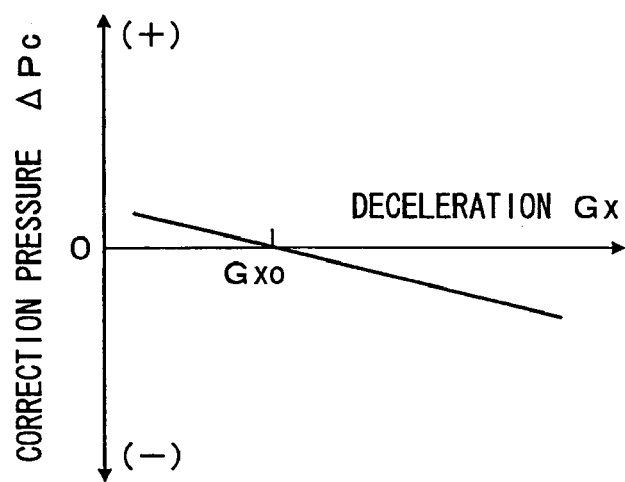
FIG. 4B shows a map of a correction pressure ΔPc vs. deceleration Gx, used in calculation of the correction pressure.

These maps may be obtained experimentally or theoretically and stored in memory in the microcomputer 92. In FIG. 4B, Gxo, where ΔPc =0, may be a standard deceleration generated on a standard weighted vehicle during braking.

In accordance with the holding of the rear wheel braking pressure, the total braking force to be exerted for the vehicle will be short, while locking of the rear wheel prior to locking of the front wheel is prevented. Thus, in the embodiment of the present invention, the front wheel braking force is incremented to compensate for a shortage in the rear wheel braking force. With reference to FIG. 3B showing braking pressures Pf, Pr in the front and rear wheel cylinders supplied with master cylinder Pm, the pressure Pf for the front wheels will be incremented by $\Delta Pf$, i.e. $Pf=Pm+\Delta Pf$, while the rear wheel cylinder is held at Pc. The increment $\Delta Pf$ for the front wheels corresponds to the braking force that would be produced with the restricted amount in the rear wheel braking pressure $\Delta Pr$, the difference between Pm and Pr(=Pc).

Practically, the increment $\Delta Pf$ will be determined as a function of the decrement of the rear wheel braking pressure, i.e. the difference between the master cylinder pressure and holding pressure, Pm-Pc, taking into account braking performances of the front and rear wheels and the vehicle speed-dependent braking effectiveness of the front wheels for the vehicle body, as described below.

Firstly, a braking force increment on the front wheel $\Delta Ff$ is equal to a force decrement on the rear wheel $\Delta Fr$. $\Delta Ff$ and $\Delta Fr$ are given by:

$$\Delta Ff = \Delta Pfo \times (Sf \times Rf \times BEFf)$$

$$\Delta Fr = \Delta Pr \times (Sr \Delta Rr \Delta BEFr)$$

where $\Delta Pfo$ is a basic front wheel braking pressure increment (before corrected with the braking effectiveness dependent upon a vehicle speed); Sf, Sr, sectional areas of the front and rear wheel cylinders; Rf, Rr, braking effective radii for the front and rear wheels; and BEFf, BEFr, braking effectiveness factors for the front and rear wheels. The sectional areas and braking effective radii are determined by specifications of the front and rear wheel braking force generating apparatus, and the braking effectiveness factors are experimentally obtained.

Since $\Delta Ff = \Delta Fr$ is to be established, the basic front wheel braking pressure increment is given by:

$$\Delta Pfo = \Delta Pr \times (Sr \times Rr \times BEFr)/(Sf \times Rf \times BEFf) \quad (2)$$
$$= (Pm - Pc) \times (Sr \times Rr \times BEFr)/(Sf \times Rf \times BEFf)$$

Figure 5:
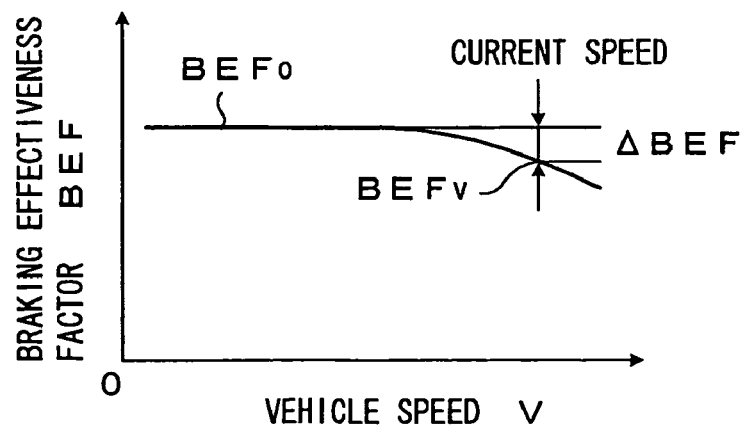
FIG. 5 shows a map of braking effectiveness factor of a front wheel on a vehicle vs. a vehicle speed, used in correction of the braking pressure increment for a front wheel.

Secondly, it has been experimentally revealed that the braking effectiveness factor of the front wheel pressure for a vehicle body, BEF, is decreased dependent upon a vehicle speed as shown in a map of FIG. 5. Thus, the basic front wheel pressure increment may be modified as follows:

$$\Delta Pf = \Delta Pfo \times (1 + \Delta BEF/BEFo) \quad (3)$$

where BEFo is a reference braking effectiveness, measured at a predetermined reference speed; and $\Delta BEF$, a deviation of the effectiveness at current speed from the reference. The calculations of expressions (2) and (3) are executed in real time with the microcomputer 92 in which all the required factors, constants and the map can be stored in memory.

Although not shown here, a braking effectiveness of a rear wheel on the vehicle may be modified similarly with respect to its dependency upon a vehicle speed.

As noted, the front wheel braking pressure is adjusted to Pm +$\Delta Pf$ through controlling the energization current fed to the pressure regulating valve 22 and operating the pump 42.

By the way, auxiliary braking force control such as BAC, if any, will request increasing braking pressures for the wheels beyond the master cylinder pressure, in order to obtain higher braking force than requested directly by a driver's braking action. BAC is executed, for example, when a driver makes an abrupt and relatively high braking action (in practice, when the master cylinder pressure and its differential each exceed the respective predetermined reference values). Since the rear wheel braking pressure is held at the holding pressure Pc in order to avoid locking the rear wheels prior to locking the front wheels irrespective of the presence of such BAC, the increment of braking force requested by BAC that would be added to the rear wheels should be compensated for in the front wheels so as to reflect the effect of BAC in the total braking force on the vehicle.

Practically, the pressure increment of braking assist control for the rear wheels $\Delta Pbar$ is added into the basic pressure increment for the front wheel as follows:

$$\Delta Pfo = (Pm + \Delta Pbar - Pc) \times (Sr \times Rr \times BEFr)/(Sf \times Rf \times BEFf) \quad (4)$$

and therefore, $$Pf = Pm + \Delta Pbaf + \Delta Pf \quad (5)$$

where $\Delta Pbaf$ is the pressure increment of braking assist control for the front wheel. $\Delta Pf$ in exp. (5) may be modified through exp. (3) with respect to the vehicle speed-dependency of the braking effectiveness on a vehicle body. It should be noted that the increment of BAC requested before the starting of the BFD control has been taken into account in the holding pressure Pc.

Consequently, even during the execution of BFD control, BAC is effective without loosing or reducing the total braking force to be applied on the vehicle body. It should be noted that a pressure increment through other auxiliary braking control such as a Hydro Assist Braking (HAB) system may be incorporated similarly.

Typically, BFD control for holding the rear wheels at the holding pressure Pc may be started when the master cylinder pressure Pm reaches the holding pressure Pc on the assumption that the rear wheel braking pressure Pr is nearly equal to the master cylinder pressure in the absence of BFD control and any other control for modifying braking pressure. As described above, when BAC has been already executed before starting BFD, the rear wheel braking pressure Pr is nearly equal to the sum of Pm and $\Delta Pbar$. Thus, the rear wheel cylinders are held when the sum of Pm and $\Delta Pbar$ reaches to the holding pressure Pc.

Further, the BFD control may be started in response to other conditions, for instance, when the deceleration Gx exceeds a reference deceleration Gxs (a positive constant) for starting BFD control; when the difference between an average wheel speed of the front left and right wheels and that of the rear left and right wheels ($\Delta Vw = 1/2(VwFL+VwFR-VwRL-VwRR)$) exceeds a reference speed Vws (a positive constant) for starting BFD control; and when both the conditions of the deceleration and average wheel speed are established. When BFD is stated to hold the rear wheel braking pressure in response to conditions other than the master cylinder pressure, the pressure increment for the front wheels will be calculated with reference to the master cylinder pressure Pm at the holding as the holding pressure Pc irrespective of the maps of FIGS. 4A and 4B.

Preferably, BFD control lasts as long as Pm, Gx, or $\Delta Vw$ exceeds Pc, Gxs or $\Delta Vw$. In practice, the BFD control may be terminated when either or all of Pm, Gx and $\Delta Vw$ fall below the respective reference values, Pme (a positive constant); Gxe (a positive constant); and Vwe (a positive constant). The reference values, Pme, Gxe, Vwe are preferably rather smaller than the corresponding Pc, Gxs, Vws, in order to avoid hunting in the control.

It should be realized that the conditions of the starting and ending of BFD control may be theoretically and/or experimentally determined in various manners known in the art.

In the following, referring to FIG. 6, operation of the braking force distribution control device, explained above with reference to FIGS. 1A and 1B, will be described. The control according to a control routine shown in FIG. 6 is started by a closure of an ignition switch (not shown in FIG. 1) and cyclically repeated at a cycle time such as several milliseconds during the operation of the vehicle. In this routine, basically, before execution of BFD, the holding pressure Pc is calculated based upon current vehicle speed, etc., in every cycle. However, once the BFD is started, the rear wheel braking pressure is held and variations of braking action by a driver and demand of BAC, if any, are reflected only in the front wheel braking pressure. Thus, in this case, steps of calculation of the holding pressure and judgment of the starting of BFD are bypassed until any condition for terminating the BFD is established.

Firstly, in step 10, the signals shown in FIG. 1B and the aforementioned parameters required in the following steps are read in. If BAC has been already executed, the parameters of the increments for the wheels ΔPbaf, ΔPbar, determined by a BAC control process, have significant values. ΔPbaf=ΔPbar is possible.

In step 20, whether or not the BFD control has been already executed is judged. If BFD is not executed, a holding pressure Pc is determined in steps 30-50 based upon a vehicle speed V and a (the) deceleration Gx by using maps in FIGS. 4A and 4B.

Next, in steps 60 and 70, it is detected if BFD is to be executed. When the master cylinder pressure plus the increment of BAC, if any, Pm+ΔPbar, regarded as a current rear wheel braking pressure, exceeds the holding pressure Pc (step 60) or when the other aforementioned condition for starting BFD is established, the judgment of starting of BFD is performed and steps 100-120 for calculating the target front wheel braking pressure will be executed by using the aforementioned equations (2)-(5) together with the map in FIG. 5. In this connection, in the absence of BAC, ΔPbaf and ΔPbar should be zero or ignored in the calculation. If it is determined in step 70 that BFD is started, the holding pressure Pc is re-defined to be the value regarded as the current rear wheel braking pressure: Pc←Pm+ΔPbar.

Then, in accordance with the above result, the valves in the hydraulic circuit are operated in step 130. Namely, the valves for isolating the rear wheel cylinders 28RL, RR are closed while the pressure regulating valve 22F and valve 60F are closed and opened, respectively, and the pump 42F is started. If BAC has been executed, the valves 28RL, RR are closed. Then, in order to control the front wheel braking pressure, the energization current corresponding to Pf is fed to the regulating valve 22F.

If either of the conditions for starting BFD is not established in steps 60 and 70, the routine returns to Start without executing steps 100-130, without BFD control being executed.

When it is determined in step 20 that BFD already has been executed, step 90 is executed directly, in which case it is detected if BFD is to be terminated by checking any establishment of the aforementioned conditions for terminating BFD. If BFD is to be terminated, the valves are operated so as to release the holding of the rear wheel braking pressure while ceasing the increase of the front wheel braking pressure beyond the master cylinder pressure. The process for releasing the holding may be done gradually, e.g., by opening the valves 28RL, RR intermittently in order to avoid any abrupt variation of a pressure in a wheel cylinder.

If NO in step 90, steps 100-130 are executed again, while bypassing steps 20-80. In step 130, the valves in the hydraulic circuit are operated so as to control only the front wheel braking pressure because the valves for holding the rear wheel cylinders have been closed in the previous cycle. Then, the process of the flowchart is restarted.

Although the present invention has been described in detail with respect to preferred embodiments thereof, it will be apparent to those skilled in the art that various other modifications are possible with respect to the shown embodiments within the scope of the present invention.

For instance, a braking system implementing the present invention may be of a type in which wheel cylinders for the respective wheels are independently controllable. As long as braking force is controllable beyond the braking force requested by a braking action by a driver, the present invention, in view of its features, is applicable to a braking system of any type.

In the afore-mentioned embodiment, braking force has the identical magnitude in each of the pairs of front wheels and rear wheels. However, it should be realized that, depending upon a behavior and/or a turning condition of a vehicle, the left and right wheels in each pair of wheels may be controlled so as to generate different forces.

Further, the present invention is applicable to systems where a wheel cylinder pressure sensor for each wheel is provided.

In addition, in the present embodiment, a rear wheel is held at the holding pressure by closing the corresponding valve. The pressure in a rear wheel cylinder (or front wheel cylinder), however, may be controlled for maintaining a holding pressure through operation of the corresponding valves (pulsative or dithering increase or decrease) in lines connected toward a common line and/or a reservoir. In this connection, the holding force and/or holding pressure for the rear wheel may be varied depending upon a vehicle speed and/or deceleration in every cycle of the control routine during BFD control.

It should be noted that values for a holding pressure, Pc, Pcs or ΔPc and an increment for the front wheels ΔPfo, ΔPf may be determined differently without deviating the scope of the present invention. Although it is preferable to take into account vehicle speed- and deceleration-dependencies and other characteristics of these values for achieving a highly accurate and appropriate control, some of those characteristics may be ignored depending upon the required accuracy of the control and/or costs of manufacturing, operating and/or maintaining a device.

The invention claimed is:

1. A device for controlling braking force of a vehicle, the vehicle having front and rear wheels and braking force generating apparatuses provided for each of the wheels, the device executing a braking force distribution control operation that restricts an increase of a braking force on the rear wheels, generated by the braking force generating apparatuses of the rear wheels, to provide a braking force distribution among the front and rear wheels, biased to the front wheels, under a predetermined condition, wherein as the front wheel braking force increases during execution of the braking force distribution control operation, the device controls the braking force generating apparatuses of the front wheels to increment the front wheel braking force beyond the braking force increase by an amount based on a restricted amount of the braking force on the rear wheels.

2. A device of claim 1, further comprising a master cylinder receiving a braking action by a driver of the vehicle and providing an operational fluid pressure corresponding to the braking action to wheel cylinders in the braking force generating apparatuses; wherein the increase of the braking force of the rear wheels is restricted by restricting an increase of pressures in the wheel cylinders of the rear wheels; and wherein the front wheel braking force is incremented by (1) determining an increment in the wheel cylinders of the front wheels based upon the braking action by the driver, the pressures in the wheel cylinders of the rear wheels and parameters each indicating a braking performance of one of the respective braking force generating apparatuses of the front and rear wheels, and (2) incrementing pressures in the front wheel cylinders based upon the determined increment.

3. A device of claim 2, wherein the vehicle has a sensor monitoring a vehicle speed, and wherein the parameters indicate braking performances which decrease as the vehicle speed increases.

4. A device for controlling a braking force of a vehicle, the vehicle having front and rear wheels, a braking system that generates braking forces on the respective wheels, and at least one sensor that monitors an operational condition of the vehicle, including a detector that detects an amount of a braking action by a driver of the vehicle, the device executing a braking force distribution control operation in which a braking force on the rear wheels is lowered in comparison with a braking force on the front wheels when an operational condition monitored by a sensor among the at least one sensor satisfies a predetermined condition, wherein the braking force on the front wheels during execution of the braking force distribution control operation is increased, and wherein a braking force increment on the front wheels beyond the braking force increase corresponding to the braking action is determined based upon an increment of the braking action by the driver detected by the detector.

5. A device of claim 4, wherein the braking force increment on the front wheels is determined based upon the increment of the braking action and the braking force on the rear wheels.

6. A device of claim 4, wherein during execution of auxiliary braking control for increasing braking force on the wheels beyond braking force corresponding to the amount of braking action by the driver in addition to execution of the braking force distribution control, the braking force increment on the front wheels is determined based upon the increment of the braking action and an increment of braking force requested by the auxiliary braking control.

7. A device of claim 4, wherein the braking system comprises a hydraulic circuit connected with a master cylinder and braking force generating apparatus including wheel cylinders provided for the respective wheels; the braking action is reflected in a pressure in the master cylinder pressure, wherein during execution of auxiliary braking control for increasing braking force on the wheels beyond braking force corresponding to the amount of the braking action by the driver in addition to execution of the braking force distribution control, the braking force increment on the front wheels is determined based upon a difference between a current master cylinder pressure and a rear wheel cylinder pressure at the starting of the braking force distribution control and an increment of braking pressure requested by the auxiliary braking control; and in the absence of auxiliary braking control, the braking force increment on the front wheels is determined based upon a difference between the current master cylinder pressure and the rear wheel cylinder pressure at the starting of the braking force distribution control.

8. A device of claim 7, wherein the rear wheel cylinder pressure at the starting of the braking force distribution control is a sum of the master cylinder pressure and an increment of braking pressure requested by the auxiliary braking control to the rear wheels at the starting of the braking force distribution control while any auxiliary braking control is executed.

9. A device of claim 7, wherein the increment requested by the auxiliary braking control is the increment requested to the rear wheels when increments requested to the front and rear wheel cylinders by the auxiliary braking control are different from each other.

10. A device of claim 4, wherein the braking force increment on the front wheels is substantially equal to the restricted amount of the braking force on the rear wheels.

11. A device of claim 6, wherein the auxiliary braking control is a braking assist control executed when an abrupt braking action is executed.

12. A device of claim 4, wherein during execution of the braking force distribution control, the braking force on the rear wheels is held at a predetermined value.

13. A device of claim 7, wherein during execution of the braking force distribution control, the pressures in the rear wheel cylinders are held at a predetermined pressure.

* * * * *